(12) United States Patent
Sulaiman et al.

(10) Patent No.: US 9,489,662 B2
(45) Date of Patent: Nov. 8, 2016

(54) APPARATUS AND METHOD FOR STORING ELECTRONIC RECEIPTS ON A UNIFIED CARD OR SMARTPHONE

(75) Inventors: Ayman Sulaiman, Ripon, CA (US); Riyadh A Al Quaqezeh, Ripon, CA (US)

(73) Assignee: RETAILGREEN, INC., Sacramento, CA (US)

( * ) Notice: Subject to any disclaimer, the term of this patent is extended or adjusted under 35 U.S.C. 154(b) by 471 days.

(21) Appl. No.: 13/698,773

(22) PCT Filed: Nov. 9, 2011

(86) PCT No.: PCT/US2011/060046
§ 371 (c)(1),
(2), (4) Date: Jan. 22, 2013

(87) PCT Pub. No.: WO2012/064882
PCT Pub. Date: May 18, 2012

(65) Prior Publication Data
US 2013/0211936 A1    Aug. 15, 2013

Related U.S. Application Data

(63) Continuation-in-part of application No. 12/942,741, filed on Nov. 9, 2010, now abandoned.

(51) Int. Cl.
*G06Q 20/00* (2012.01)
*G07F 19/00* (2006.01)
*G07B 17/00* (2006.01)
*G06Q 20/04* (2012.01)
(Continued)

(52) U.S. Cl.
CPC ........ *G06Q 20/0453* (2013.01); *G06Q 30/012* (2013.01); *H04L 9/3234* (2013.01); *H04L 2209/56* (2013.01)

(58) Field of Classification Search
CPC ...... G06Q 20/00; G06Q 10/00; G06Q 40/00; G06Q 30/00
USPC .......... 705/7.32, 16, 17, 21, 39, 14.64, 705, 705/41, 30, 1; 710/1
See application file for complete search history.

(56) References Cited

U.S. PATENT DOCUMENTS

| | | | | |
|---|---|---|---|---|
| 5,915,022 A | * | 6/1999 | Robinson | G06Q 20/00 380/30 |
| 6,738,749 B1 | * | 5/2004 | Chasko | G06Q 20/105 705/16 |
| 8,738,454 B2 | * | 5/2014 | Argue | G06Q 20/0453 705/16 |

(Continued)

OTHER PUBLICATIONS

International Search Report related to PCT/US11/60046 mailed Mar. 29, 2012.

(Continued)

*Primary Examiner* — Olusegun Goyea
(74) *Attorney, Agent, or Firm* — Dergosits & Noah LLP

(57) ABSTRACT

A receipt system allows customers to store receipts on a Unified Card or smartphone when making purchases from different retailer merchants. The customer purchases goods or services and the receipt is recorded electronically onto a single Unified Card or smartphone. This eliminates the need for paper receipts. The user can then use the Unified Card or smartphone to make returns or exchanges or as proof of purchase. Unified Card readers can be located at Kiosks as part of a home based system that works with the user's home computer.

26 Claims, 16 Drawing Sheets

(51) Int. Cl.
*H04L 9/32* (2006.01)
*G06Q 30/00* (2012.01)

(56) References Cited

U.S. PATENT DOCUMENTS

| | | | | |
|---|---|---|---|---|
| 2002/0016739 | A1* | 2/2002 | Ogasawara | G06K 17/00 705/22 |
| 2003/0055733 | A1* | 3/2003 | Marshall | G06Q 20/0453 705/24 |
| 2004/0220964 | A1* | 11/2004 | Shiftan | G06Q 10/087 |
| 2004/0225567 | A1* | 11/2004 | Mitchell | G06Q 20/0453 705/16 |
| 2005/0060437 | A1* | 3/2005 | Doyle | G06Q 30/06 710/1 |
| 2005/0165651 | A1* | 7/2005 | Mohan | G06Q 20/0453 705/14.64 |
| 2006/0106719 | A1* | 5/2006 | McDonnell | G06K 19/07309 705/50 |
| 2008/0040271 | A1* | 2/2008 | Hammad | G06Q 20/085 705/41 |
| 2008/0189184 | A1* | 8/2008 | Kubo | G06Q 20/20 705/16 |
| 2009/0254476 | A1* | 10/2009 | Sharma | G06Q 20/10 705/39 |
| 2009/0307491 | A1* | 12/2009 | Nakatsugawa | G06Q 20/341 713/169 |
| 2010/0100434 | A1* | 4/2010 | Sock | G06Q 20/0453 705/14.38 |
| 2010/0105454 | A1* | 4/2010 | Weber | G06Q 30/02 463/1 |
| 2011/0208561 | A1* | 8/2011 | Randall | G06Q 30/02 705/7.32 |

OTHER PUBLICATIONS

Written Opinion of the International Searching Authority related to PCT/US11/60046 mailed Mar. 29, 2012.

* cited by examiner

| Info | | | | |
|---|---|---|---|---|
| Shop Name | Subway | Done. | | |
| Add eReceipt | Read/Refresh eReceipts | | Manual Format | |
| Search | | | | |
| Bar Code | | | | |

| BarCode | Insert Date | Total |
|---|---|---|
| 1234567ASD | 10/11/2010 3:50 | 900 |

| BarCode | Price | Quantity | Total |
|---|---|---|---|
| 0908888T… | 10 | 90 | 900 |

Add New Customer

Email address

Username

Password

Confirm Password

Add User

Cancel

APPARATUS AND METHOD FOR STORING ELECTRONIC RECEIPTS ON A UNIFIED CARD OR SMARTPHONE

CROSS REFERENCE TO RELATED APPLICATIONS

This is a U.S. National Phase Application of PCT/US2011/60046, "APPARATUS AND METHOD FOR STORING ELECTRONIC RECEIPTS ON A UNIFIED CARD OR SMARTPHONE" filed Nov. 9, 2011 which claims priority to U.S. patent application Ser. No. 12/942,741, "APPARATUS AND METHOD FOR STORING ELECTRONIC RECEIPTS ON A UNIFIED CARD" filed on Nov. 9, 2010. The entire contents of PCT/US2011/60046 and U.S. patent application Ser. No. 12/942,741 are hereby incorporated by reference.

BACKGROUND

Many people start the work day by making a going to a gas station, parking to catch the train, then going to a Starbucks to pick up a coffee. Around mid day, people may stop by the local deli, Subway, or any restaurant to get our lunch followed by dessert if possible. At the end of the work day on the way back home, many people stop to pickup our dry cleaning, then go to a grocery store to buy our daily essentials like milk, juice, bread, etc. By the end of the week day, a person can accumulate 10-12 paper receipts. Weekends can include many purchases such as shopping at stores, drive through food, movies, car washes, etc. Essentially, at the end of each week, people can collect a large amount of receipts most of which end up in their wallets waiting to be reconciled or used again for a return or exchange. This can be an infinite cycle on a daily basis and millions of paper receipts are generated from sales that may not have an immediate use or need. At the end of the month, reconciling all of these receipts can be a very time consuming process.

Paper receipts are widely used throughout the world, where every single cash register point of sale "POS" generates a paper receipt that is printed for the end user or for a customer as a proof of sale. This accumulation of receipts can become a necessary burden on the end customer since these receipts must be saved for returns, exchanges, taxes, tracking of personal spending, etc.

Many have tried to come up with a solution to this problem. For example, cloud data storage, credit card systems, many options for receiving/storing receipts including scanners etc. There is no widely known system or method that overcomes the above issues. What is needed is a system that allows users to record all sales receipts, is simple to operate and does not require personal information, and or pre registration to activate this service which can be stolen.

SUMMARY OF THE INVENTION

A Unified Card system and method can be used by customers to store receipts from different retailer merchants like: Starbucks, Subway, McDonalds, Baskin Robin, or any other goods or service providers. The customers can store all receipts on their Unified Card without having to pre register, sign up, or even filling out a form.

Consumers can simply utilize the service by getting a Unified Card and using it when purchases are made at stores that have the Unified Card reader system installed. In an embodiment, the Unified Cards will be available free of charge at participating retailers. Simply using the Unified Card enables the customer to store any receipt from any vendor onto their Unified Card. In an embodiment, retailers will need to get a license to install the Unified Card application software and card readers onto their register system. The license will allow merchants, vendors or retailers to use the Unified Card application services. The license can be based upon various different schemes. For example, the merchant or corporate entity may pay a fee such as a monthly or annual fee. Alternatively, the license can be based upon the number of transaction recorded onto the Unified Storage card. It is also possible for the license to be given for free.

Upon the installation of the application on the merchant's cash registers some conditions may be applicable. For example, the merchant's name, may need to be maintained for each associated shop. For example, an auto shop will be given an auto shop ID that gets generated accordingly as a credential to invoke the Unified Card component in order to reserve a specific designated area in the unified card memory for this shop. A mutual active authentication protocol can be used to identify each transaction from the different branches of the auto shop.

The system can provide various different security features for each shop and system component at all levels including: Communication, Hardware, Operating System and the Software. In an embodiment, the security features can include communications with small data packets that is called Application Protocol Data Units (APDUs), and cryptographic algorithms that encrypt the data and transfer for this particular shop. These APDUs can be used as a command and response system between the Unified Card and reader as a secure mean of communication between the Unified Card and the card reader coupled to the merchant's register system or other kiosk or home systems. In other embodiments various other security systems can be used to protect the data stored on the Unified Card.

In addition to the card readers at the merchant registers, the uses may be able to access the recorded sales transactions through other card readers. Some card readers can be located at Kiosks that are at the stores. The Kiosks can have displays that allow the user to see a listing of transactions. The kiosks may also have special data output systems for blind people such as a headphone jack or Braille output systems. A home based card reader may also be available which is connected to the user's home computer. The home system may allow a user to review all purchase transactions and perform certain tasks such as add up spending in various formats such as monthly, weekly and daily spending, spending by store, spending by time of day, etc.

In another embodiment, a smartphone or portable computer such as an Apple, Android, Kindle or other tablet computer can be used to store receipts from different merchants in a manner similar to the unified card described above. In this embodiment, the smartphone or mobile computer can include at least a portion of a memory for storing receipts from merchants and a software application which allows the smartphone to be used with the unified card stores. The user can download the application and the register for the unified card service. A server computer can then store information about the user in a database.

When a purchase is made the user can display the bar code or emit an optical or RF signal associated with the registered user. This bar code or signal can be read or scanned by an input device at the cash register and the purchase goods information can be stored in a cloud server. The application enables the customer to review all receipts for goods purchased by the user. The listing of receipts can be stored in the cloud server and the smartphone or mobile computer memory can be refreshed anytime to get the current receipts data. The receipt data can include: customer detailed receipts, shop name and any other required information will be stored in the Smartphone. Purchase data can be updated and synced into the cloud server and the updated purchase receipt data can be the Smartphone accordingly. If a product needs to be returned to a store, a customer can simply perform the normal return process. The customer can be recognized at the customer service section when the smart phone or mobile computer can be recognized by a barcode or signal or an internal ID on the device. In an embodiment, the smartphone can be scanned for identification or registration information. The purchase information can then be displayed to the customer service representative in order to return the goods. The receipt stored in the cloud server and smartphone or mobile computer can be updated for the modified purchase quantities. This information can be updated and synced into the cloud and the smartphone or mobile computer accordingly.

BRIEF DESCRIPTION OF THE DRAWINGS

FIGS. 12-16 illustrate embodiments of merchant user interface screens:

FIG. 18 is a view of a user interface for registering a customer with the receipt storage system;

DETAILED DESCRIPTION

In an embodiment, the present invention is directed towards a system and method for using a one Unified Card for each user to store all of his or her receipts for purchased goods and services. The goods and services can be purchased from different a single or multiple store retailers. The receipts for the goods and services can be stored in an electronic format on the Unified Card.

The present invention combines both hardware and software devices. In an embodiment, the system includes a cash register and a card reader that can be connected to any cash register of the store retailers using a "USB" connector or any other suitable data connection. In addition to the card reader, a software application can be run on the cash registers as well. The software may enable the cash register to automatically recognize the data connection with the card reader. Once the software and card reader are configured, the system is ready to record receipt data on the Unified Cards.

Figure 1:
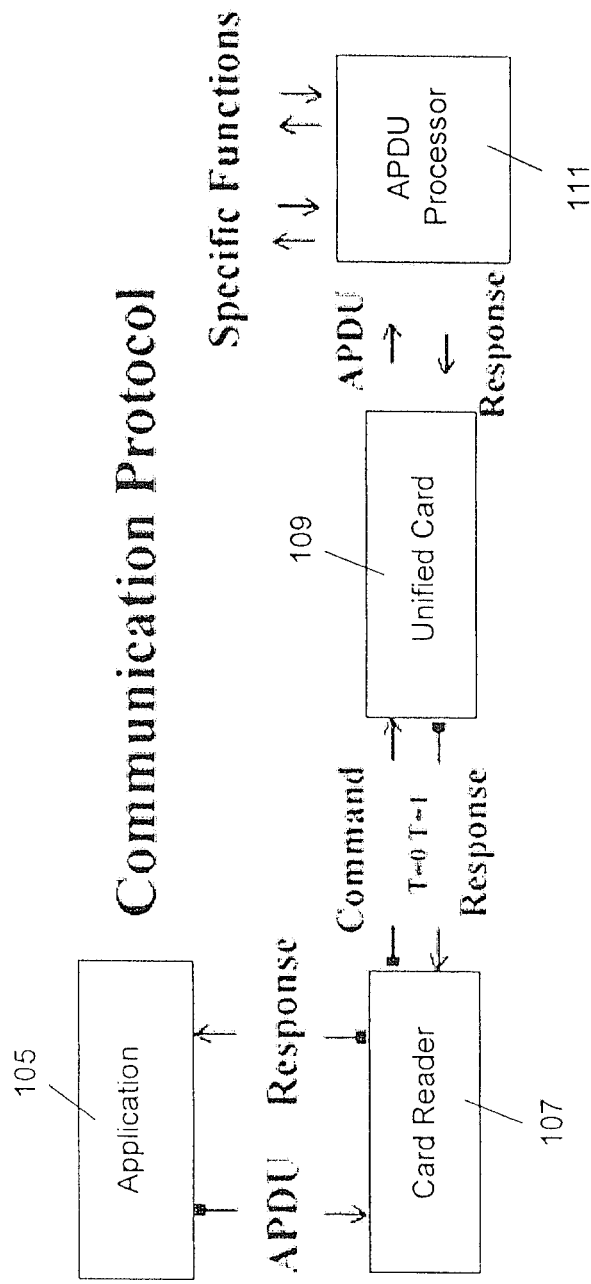
FIG. 1 is a block diagram of an embodiment of the communications protocol for the inventive system.

With reference to FIG. 1, the system can include various hardware and software components that communicate with each other. In an embodiment, the system can include an application 105 which can be software running on a computer within the merchant's check out system. The application 105 can communicate with a card reader 107 that is a hardware device that is coupled to the merchant's cash register check out system. The card reader 107 communicates with the Unified Card 109 which can include an application protocol data unit (APDU) processor 111 that performs various functions including recording the receipt data and erasing receipt data.

After the Unified Card 109 has been placed in the card reader 107, the merchant's register can communicate and record information. For example a purchase can be made and the application can issue an APDU which includes the receipt data. The reader 107 transmits the APDU as a command to the Unified Card 109. The APDU is received by the APDU processor 111 which records the receipt data. The APDU processor 111 can produce a response to the APDU which is transmitted back through the Unified Card 109 and card reader 107 to the application 105. The response can be a confirmation signal which indicates that the requested APDU command was or was not completed. The system may also include a clock which generates a time signal T=0, 1, 2, . . . which can indicate the date and time of purchase or return transactions. In other embodiments, the time data can be organized in a different time measurement standard. The time data can be recorded with the APDU. Additional functional details of the Unified Card will be described later.

Figure 2:
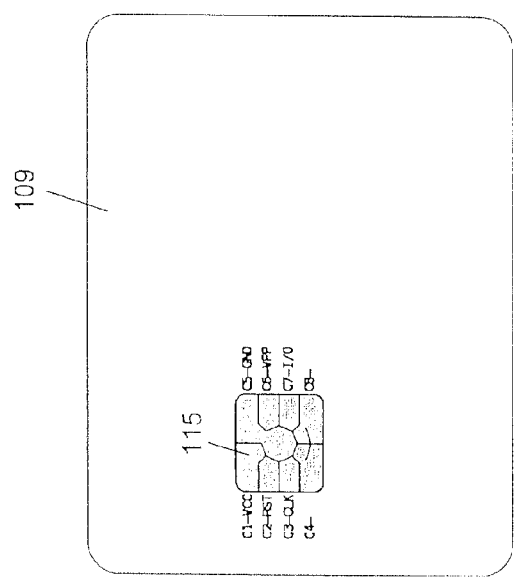
FIG. 2 is a top view of an embodiment of the Unified Card.

With reference to FIG. 2, a top view of an embodiment of the Unified Card 109 is illustrated. The Unified Card 109 can have a group of electrical contacts 115 arranged in a small rectangular shape or any other suitable shape. The illustrated example is one possible contact pad configuration of the Unified Card with the electrical signals for the contacts identified. In this example, the contact pads are labeled and their function is described in Table 1 below. In other embodiments, the Unified Card 109 can have any arrangement of electrical contacts 115 and any function applied to each of the contacts 115.

TABLE 1

| Label | Function |
| --- | --- |
| C1-VCC | Power supply input |
| C2-RST | Reset signal, used to reset the card's communications |
| C3-CLK | Clock signal from which data communications timing is determined |
| C4 | Can be AUX1 used for USB interfaces or other communications requirements |
| C5-GND | Electrical ground used with power supply and other input signals |
| C6-VPP | Programming voltage input which can be a signal input used to program persistent memory |
| C7-I/O | Serial input and output |
| C8 | Can be AUX2 used for USB interfaces or other communications requirements |

In the electrical contact embodiment, the Unified Card can have a small electrical contact area which can be approximately 1 square centimeter and may comprise several contact pads 115. These contact pads 115 provide electrical connectivity when inserted into a reader. The Unified Cards 109 may not contain batteries and power for the electrical processing can be supplied by the card reader. The card reader can have electrical contacts that correspond to the electrical contact pads 115 on the Unified Card. When the Unified Card is placed in the card reader, the electrical contacts come into contact with the electrical contact pads. The card reader can provide electrical power to the C1-VCC and C5-GND contact pads.

Figure 3:
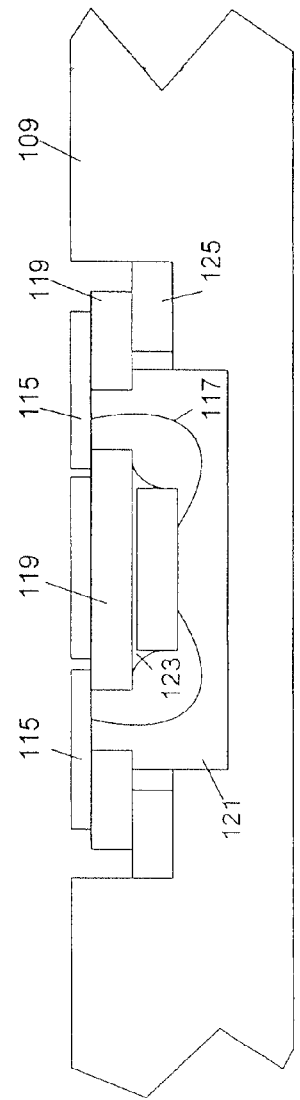
FIG. 3 is a cross section view of an embodiment of the Unified Card.

With reference to FIG. 3, a cross sectional view of an embodiment of the Unified Card is illustrated showing the electrical contact pads 115 and the APDU processor 111. The electrical contact pads 115 can be coupled to the APDU processor 111 by wires 117. The bottom of the APDU processor 111 can be protected by a dielectric encapsulation material 121 and the wires 117 can run through the encapsulation material 121. The APDU processor 111 can be bonded to a lower surface of a substrate 119 with an adhesive material 123 and the electrical contact pads 115 can be mounted on an upper surface of the substrate 119. Another adhesive 125 can be used to attach the substrate to the Unified Card 109. The upper surface of the electrical contact pads 115 can be in the same plane or recessed from the upper surface of the Unified Card 109. In other embodiments, the components of the Unified Card 109 can be arranged in different configurations.

Figure 4:
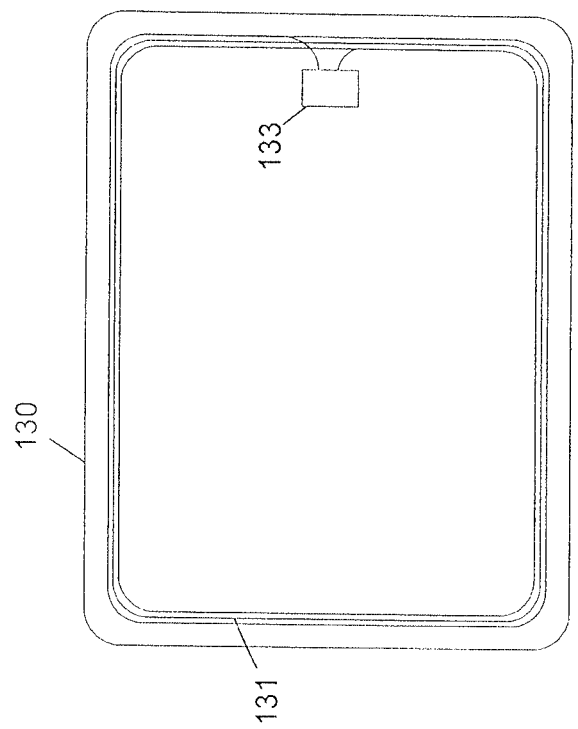
FIG. 4 is a top view of an embodiment of the Unified Card having a wireless communications system.

In another embodiment, the Unified Card may not have exposed electrical contacts that require a physical electrical connection. For example, with reference to FIG. 4, the Unified Card 110 may have a contactless device that can communicate with and be powered by the card reader through radio frequency (RF) induction technology. Rather than having electrical contacts, the Unified Card 130 can have a contactless communications mechanism that uses RF signals to transmit and receive data. The Unified Card 130 can include an antenna 131 and an APDU processor 133. These cards 130 may only require that it be placed proximity to an antenna to communicate at distances up to 20 inches or more with the card reader. The card reader can emit RF signals which transmit data signals to the Unified Card 130 and are used to power the Unified Card 130. The wireless Unified Cards antenna 131 can include a built-in inductor that uses resonant inductive coupling to capture some of the incident electromagnetic signal and rectify the RF signal to power the card's electronics including the APDU processor 133. The wireless card reader may not have any moving parts since there is no physical contact between the Unified Card 130 and the card reader.

Figure 5:
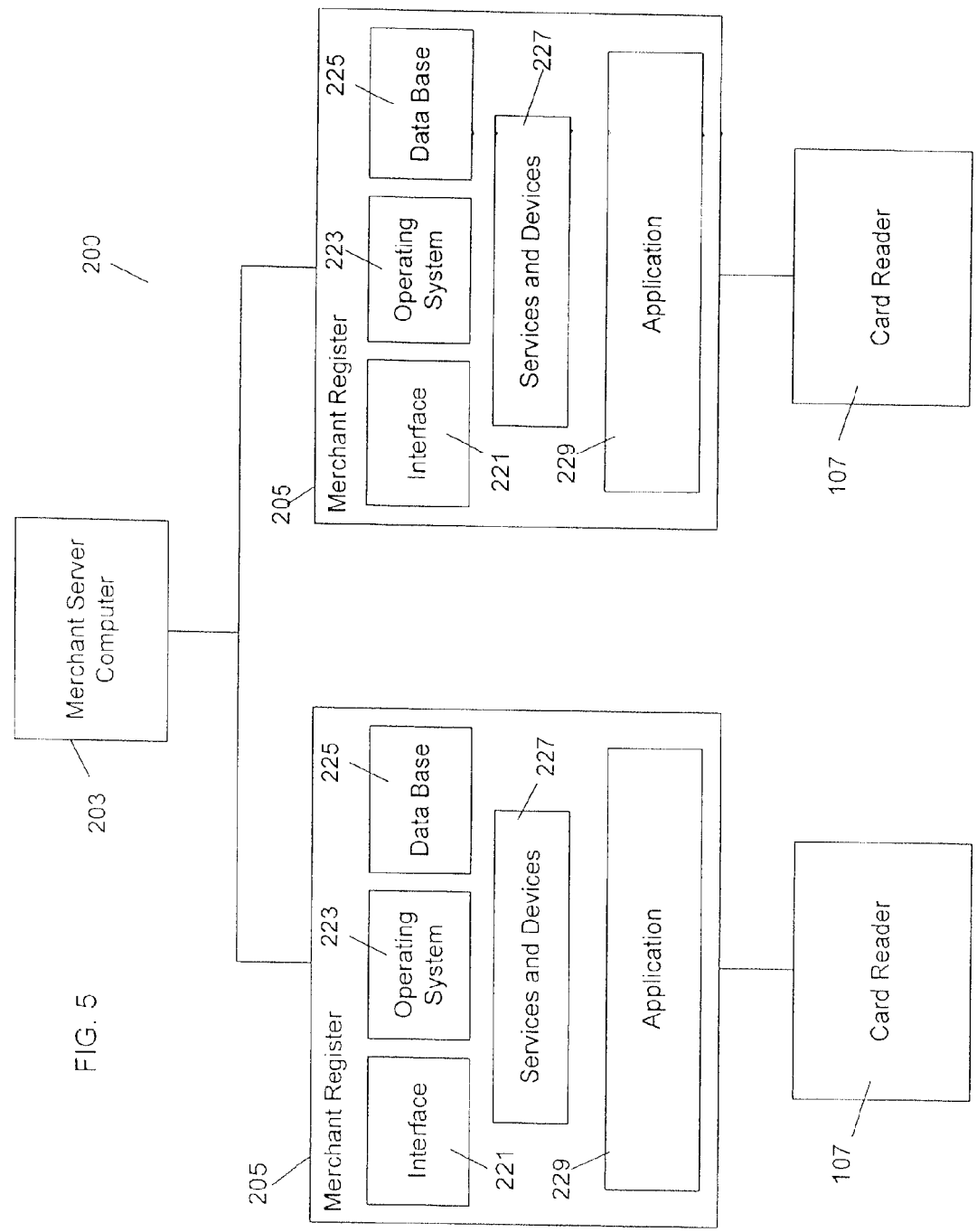
FIG. 5 is a block diagram of an embodiment of the Unified Card system integrated with a merchant register system.

With reference to FIG. 5, an embodiment of the merchant's register system 200 is illustrated. The system 200 may include a merchant server computer 203 and one or more merchant registers 205. A card reader 107 can be coupled to can be in communication with each of the merchant registers 205. The merchant registers 205 can each have a user interface 221, an operating system 223, a database 225, a set of services and devices 227 and the application program 229. The server 203 can maintain records of all transactions recorded by the merchant registers 205. Although one server 203 is illustrated in FIG. 5, in other embodiments, data can be stored in multiple servers 203 distributed through the internet to provide a cloud computing system whereby shared resources, software, and information are provided to Unified Card system components and other devices on demand. This cloud computing system can be applied to all other embodiments of the present invention.

Figures 6, 7:
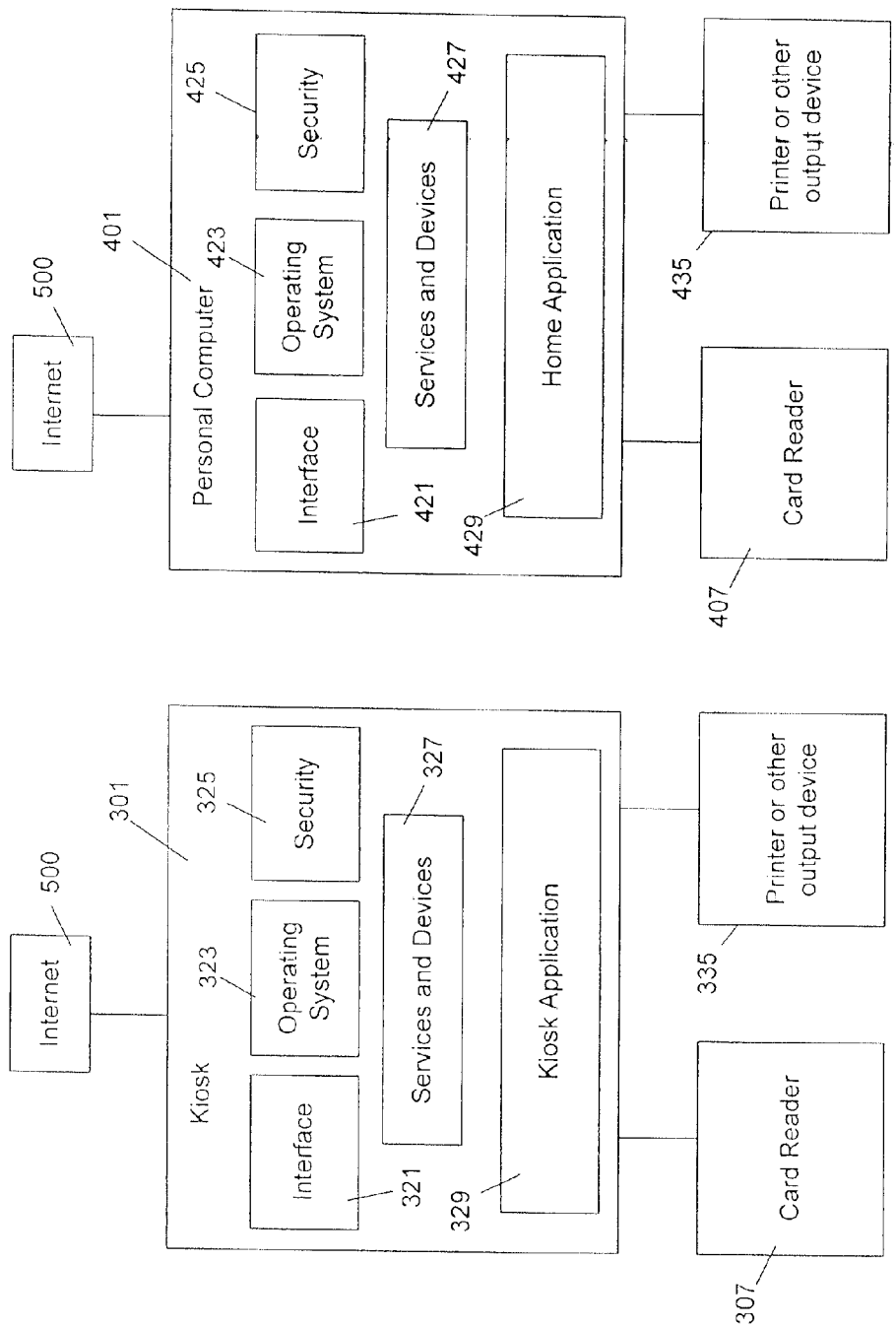
FIG. 6 is a block diagram of an embodiment of a Unified Card system kiosk.
FIG. 7 is a block diagram of an embodiment of a home kit Unified Card system used with a personal computer.

In addition to card readers that are coupled to the vendor's cash registers, additional card readers can be placed kiosks that can be located at other sites. With reference to FIG. 6, in an embodiment, the vendor's site may include a card reader kiosk machine 301 that would allow customers instant access to the electronic receipt if needed. These kiosk machines 301 may enable the customer to verify, review, and calculate his daily receipts. The kiosk machine 301 may include a user interface 321, an operating system 323, a security system 325, a set of services and devices 327 and the kiosk application program 329. The security system 325 may prevent unauthorized access to the recorded purchase transactions. For example a user of the Unified Card may program the card to require a user to input a personal identification number (PIN) or password before the kiosk 301 will allow the recorded data to be accessed. In other embodiments, various other security mechanisms can be incorporated into the kiosk machine 301. The kiosk application program 329 is different than the application program used with the merchant registered because the kiosk does not record transactions. Thus, the kiosk application 329 may allow recorded purchase data to be read from the Unified Card but may not have the ability to write data through the card reader 307 to the Unified Cards.

In an embodiment, the kiosk machine 301 may be coupled to a printer 335 for printing a receipt for a selected purchase transaction. In other embodiments, the kiosk 301 may be coupled to another output device which can be used to output the receipt. For example, the kiosk 301 may include a USB port so that a user can insert a USB flash memory device into the port so an electronic copy of the receipt can be recorded to the memory device. Alternatively, the kiosk 301 may include an audio output or audio port that would enable a blind person to insert a speaker to hear a description of the selected purchase transaction. In an embodiment, these kiosks machine 301 may only recognize the receipts for the merchant associated with the Kiosk machine 301 that are stored on the Unified Card. In other embodiments, the kiosk machines 301 may recognize all receipts stored on the Unified Card.

In an embodiment, the kiosk machines 301 can be coupled to the internet 500 or other network to allow secure communications to a main system server. This can provide a security system. For example, if the Unified Card is lost, a user can notify the system server that the serial number of other identification number is associated with a lost Unified Card. If the Unified Card is inserted into a card reader 307, the system read the serial or identification number. The system can then compare the number to a list of numbers for lost cards. If the number is not associated with a lost card, the system can continue to operate. However, if the number is identified as a lost Unified Card, the system block all viewing and use of the data stored on the Unified Card.

In yet another embodiment with reference to FIG. 7, the card readers can be part of a Home Kit reader that will comprise the reader and a CD that shall contain Unified Card application software as an executable installation application to enable the end customer of download the application software and attach a card reader 407. The personal computer system 401 may include a user interface 421, an operating system 423, a security system 425, a set of services and devices 427 and the home application program 429. Like the kiosk system, the security system 425 may prevent unauthorized access to the recorded purchase transactions. For example a user of the Unified Card may program the card to require a user to input a personal identification number (PIN) or password before personal computer system 401 will allow the recorded data stored on the Unified Card to be accessed. In other embodiments, various other security mechanisms can be incorporated into the personal computer system 401. The home application program 429 can be different than the application program used with the merchant register or the kiosk because the home system may allow a user to view transaction from all merchants.

In an embodiment, the home kit may also allow the user to perform additional tasks. The home kit may include a spend analysis tool or dynamic reporting to enable the end customer of getting whatever information he or she may need anytime. For example, the home kit application, may include programs for producing reports regarding summing all purchases made from one or more user identified merchants, summing all purchases made in a user defined time frame, reporting a cumulative purchase volume for a user defined time frame, compare different purchase volumes, etc. Because items are not purchased from home, the home application 429 may only allow recorded data to be read from the Unified Card and the home application 429 may not have the ability to write data through the card reader 407 to the Unified Cards. In other embodiments, the inventive Unified Card may be used to record receipts for on-line purchase transactions over the internet 500 through the home kit and personal computer 401.

The personal computer system can also use the internet connection for secure communications to a main system server. If the Unified Card is lost, a user can notify the system server that the serial number of other identification number is associated with a lost Unified Card. If the card is inserted into a card reader 407, the system read the serial or identification number. The system can then compare the number to a list of numbers for lost cards. If the number is not associated with a lost card, the system can continue to operate. However, if the number is identified as a lost card, the system can block all viewing and use of the data stored on the Unified Card.

The inventive system can be implemented in various different ways. For example, a merchant can obtain the application software, the card reader and a Unified Card software use license. The merchant can then install the card readers and software on one or more of the store cash register computers. The installation can be performed by running a secured "exe" file that contains the application program. A security pass code can be given to the merchant after getting the license. The security pass code can be a "one time insertion" which is used to activate the license to protect the component of not being hacked or stolen The pass code may include a security feature that looks up the computer's Mac address to guarantee that the application program is only installed on this computer. If the Mac address does not match the expected address associated with the security pass code, the program may not be allowed to fully function on the unauthorized merchant computer. After the application software and the card reader have been installed, the back end component such as a scanner or other goods input device gets registered on the computer. The system components can also have listeners or other detection devices to pick up whatever information is needed for the electronic receipts to receive from any POS application and recorded onto the Unified Card.

Figure 8:
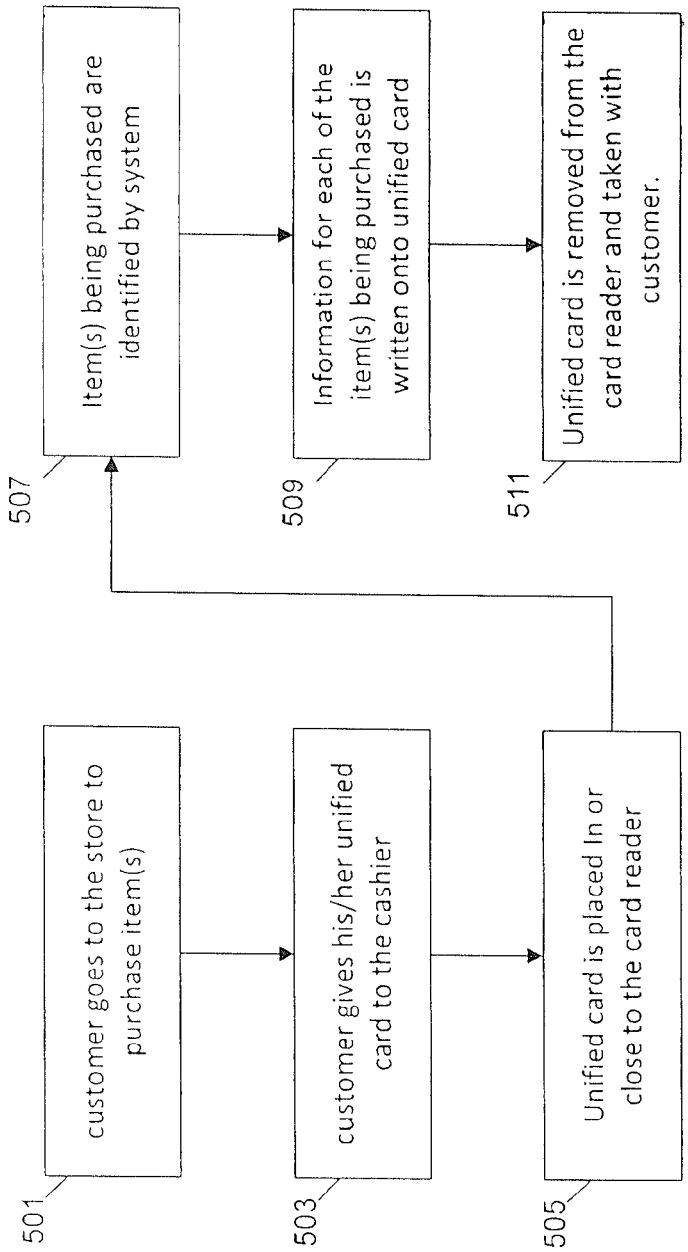
FIG. 8 illustrates a flow chart with the steps for using a Unified Card receipt for a purchase.

With reference to FIG. 8, a flow chart is illustrated for an exemplary process for using the Unified Card. A customer drops by a store to make a purchase 501. For example, a customer may go to a Subway to buy a sandwich. The cashier asks the customer for his or her Unified Card and in response, the customer gives his or her Unified Card to the cashier 503. The cashier or the customer inserts the Unified Card into the card reader 505. The cashier then clicks into the button displayed on the POS screen (e-receipt). The items being purchased are identified by the cash register system 507. For example, a sandwich can be identified and the cost of the item can be displayed. The receipt information for the item(s) being purchased is written electronically onto the Unified Card 509. The Unified Card can then removed from the card reader and taken with the purchased goods by the customer 511.

In an embodiment, a user can purchase goods through the home computer's internet connection. This process is similar to the store merchant process described above. During the internet purchase, the user can insert the Unified Card into the home kit card reader and the on-line purchase receipt can be recorded onto the Unified Card through the card reader. After the purchase has been made and the sales receipt has been written to the Unified Card, the card can be kept in the card reader to for additional internet purchase receipts or returns. The Unified Card can also be removed from the card reader and used for other store purchase transactions.

Figure 9:
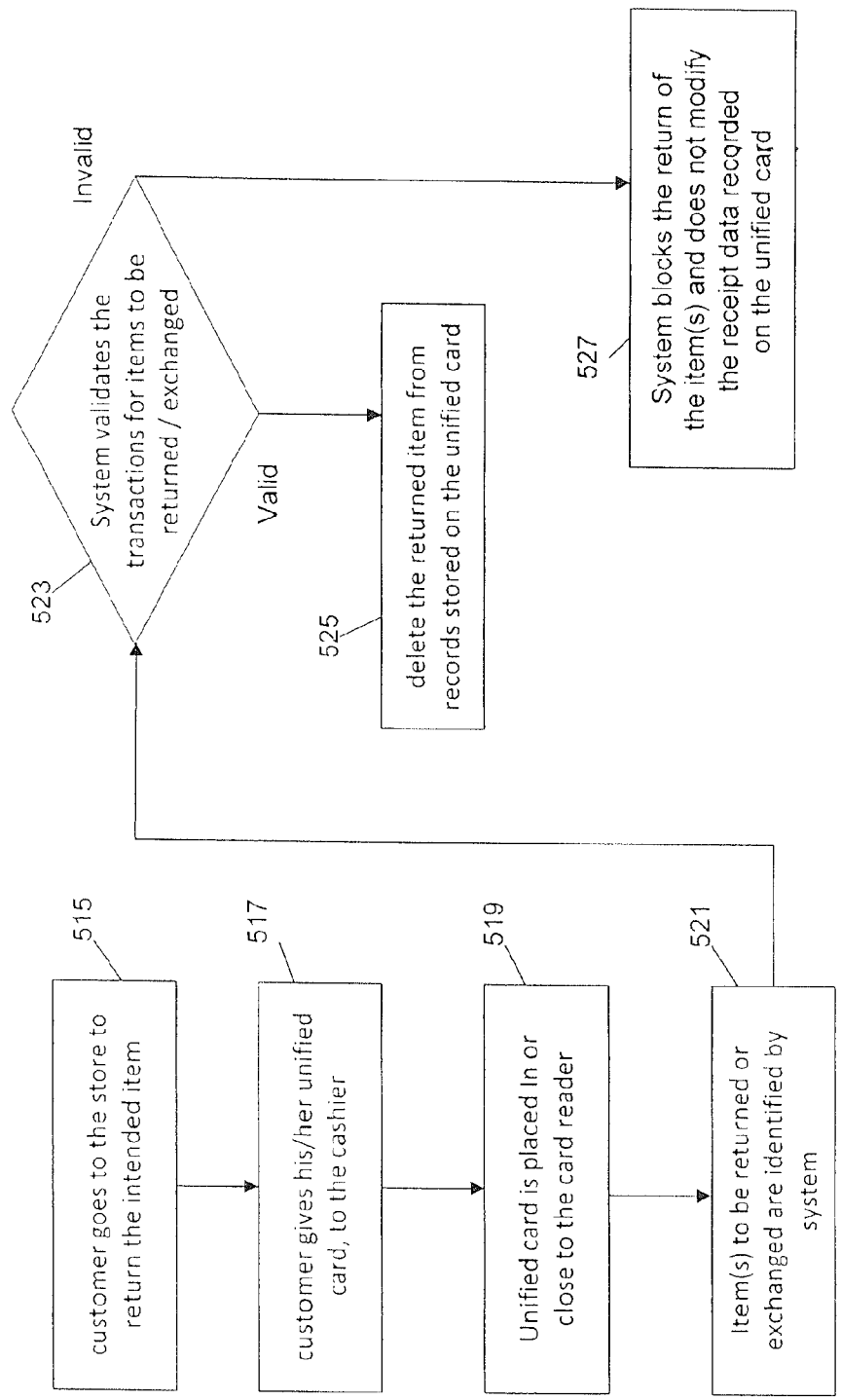
FIG. 9 illustrates a flow chart with the steps for using a Unified Card receipt for a return or exchange.

With reference to FIG. 9, a flow chart is illustrated for an exemplary process for using the Unified Card to return a purchased good(s). The user goes to the store to return the intended item 515. In most cases the user will go to the store where the purchase was made. However, in some cases, the user may return the item at a different branch location of the store. The user then provides his or her Unified Card to the cashier 517. The cashier places the Unified Card into the card reader 519 and the cashier can also identify the good(s) being returned 521. The system compares the receipt data stored on the Unified Card to the identified good(s) being returned 523. If the item corresponds to the receipt data and the return or exchange is within the required guidelines set by the store, the return or exchange is validated. The system can delete the returned item receipt data from the Unified Card and write the exchange item onto the Unified Card 525. Alternatively, if the item does not match the receipt data or the return or exchange is not permitted by the store guidelines, the return or exchange can be invalid. In this case, the system blocks the return of the items and may not modify the receipt data recorded on the Unified Card 527.

The Unified Card system may also be used by the home computer kit for processing sales receipts for returned good(s) sent back to on-line retailers. If a user wishes to return items purchased on-line, the user can mail the good(s) back to the merchant. When the good(s) are received, the merchant may send the user a message to the user confirming the return of the good(s). The user can then insert the Unified Card into the home computer card reader and log onto the merchant's web site. The system will communicate with the merchant's web site to allow the purchase receipt for the good(s) to be modified or deleted from the Unified Card to correspond to the return of the good(s).

In an embodiment, the system may record the invalid return/exchanges and identify Unified Card users as suspicious if they have a number of invalid returns that is greater than a predetermined number within a predetermined time period. For example, a user may be considered to be suspicious if there are more than 10 invalid returns in a time period of the last 3 months. These threshold values can vary depending upon the system operator or merchant guidelines.

If the system determines that a user is suspicious, the merchant may take defensive actions to prevent fraud.

Figure 10:
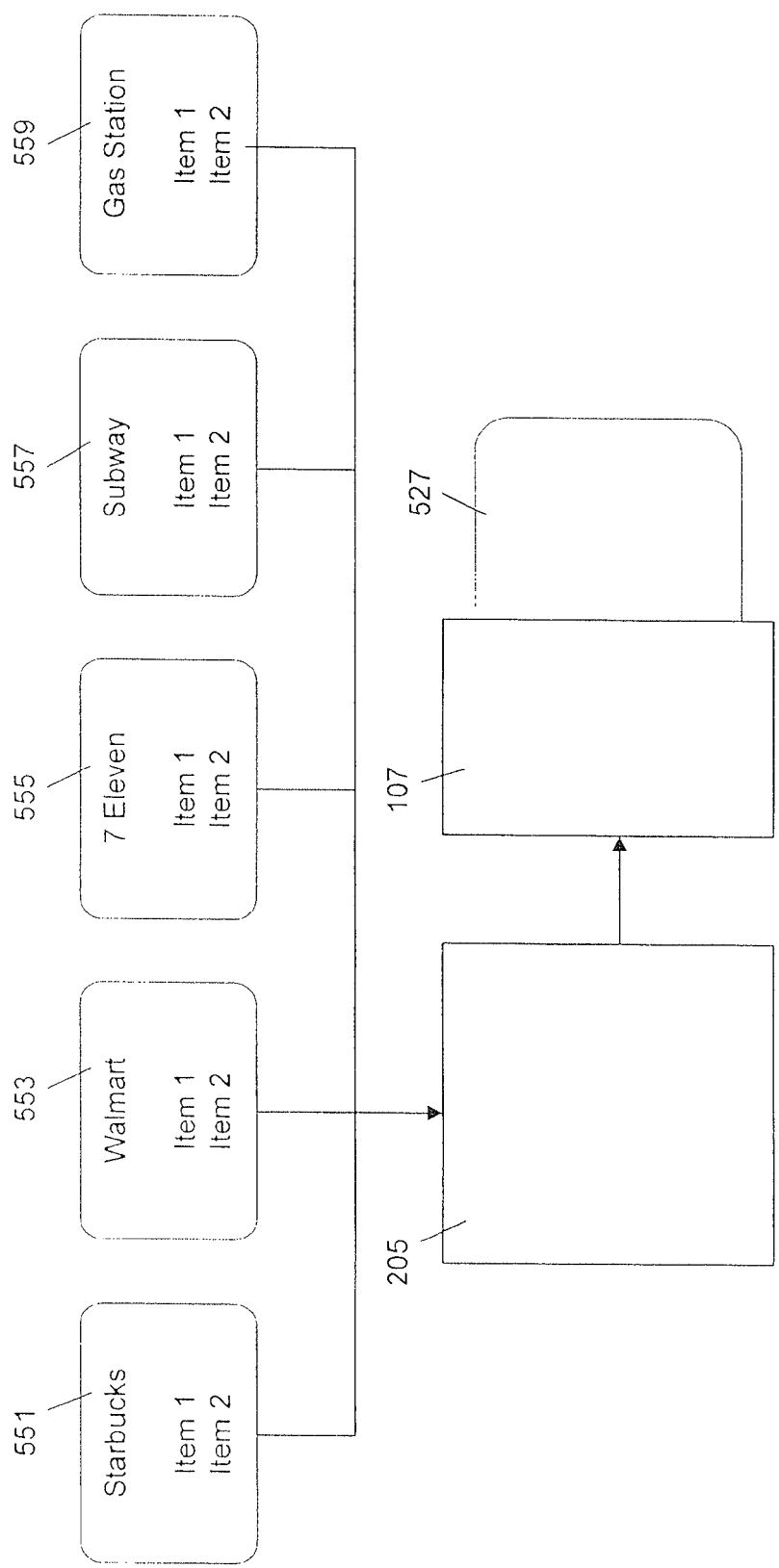
FIG. 10 illustrates a block diagram of the Unified Card system used with multiple merchants.

As discussed, the Unified Card can be used to record receipt data from multiple merchants. With reference to FIG. 10, a drawing showing multiple merchants 565 and different items purchased from each of the merchants is illustrated as being recorded by placing a Unified Card 527 in communication with a card reader 107 that is coupled to a merchant register 205. In order to keep purchases made at other merchant's confidential the recorded receipts are encoded and stored on the Unified Card 527 in a secure manner such that the receipt data for each merchant is unique. Every store can have its own secured and private encrypted designated data and every receipt is stored on the Unified Card with its own secured read/write encrypted binary code. For example, if the Unified Card 527 is used to make purchases at Starbucks 551, Walmart 553, 7-Eleven 555, Subway 557 and a gas station 559, the registers 205 and card readers 107 located at each merchant's stores may only be able to view items purchased from their store. Thus, the Starbucks' sales receipts may only be viewed by Starbucks and if the Unified Card 527 is brought to a Walmart, the Starbucks' sales receipt data will not be accessible to the Walmart registers 205 or card readers 107.

In an embodiment, data and component security are provided on the Unified Card software itself. For example, data security can be provided wherein data gets encrypted to be saved into the Unified Card using a cryptography algorithm. This encryption of the data on the Unified Card is stored in a very secure manner. In an embodiment, an ID code can be generated based upon a merchant specified configuration and the ID code can be stored as a binary files where it may never be read or be decrypted. The ID code can be processed with symmetric-key encryption which is plaintext encryption of different ciphertext with different keys. The security of encrypted data can be entirely dependent upon the strength of the cryptographic algorithm and the secrecy of the keys. Since this encryption information is kept secret, it can be difficult to decrypt or hack into stored data on the Unified Card.

In an embodiment, the Unified Card system can include a software security component that can be installed onto each merchant machine and or register that is coupled to a card reader. The software security component can use a machine specific mac address to authenticate the machine before allowing the Unified Card system to operate. The merchant's software system can also expect the software security component to be installed on each of these machines. The software security component can use the shop specific key to read write data using shop specific data store information. Thus, nothing more than what is given is provided to the Unified Card except for the encryption code itself. Using the described security systems and methods, it can take an extremely difficult to extract the encrypted data from the Unified Card without having the required encryption information.

Figure 11:
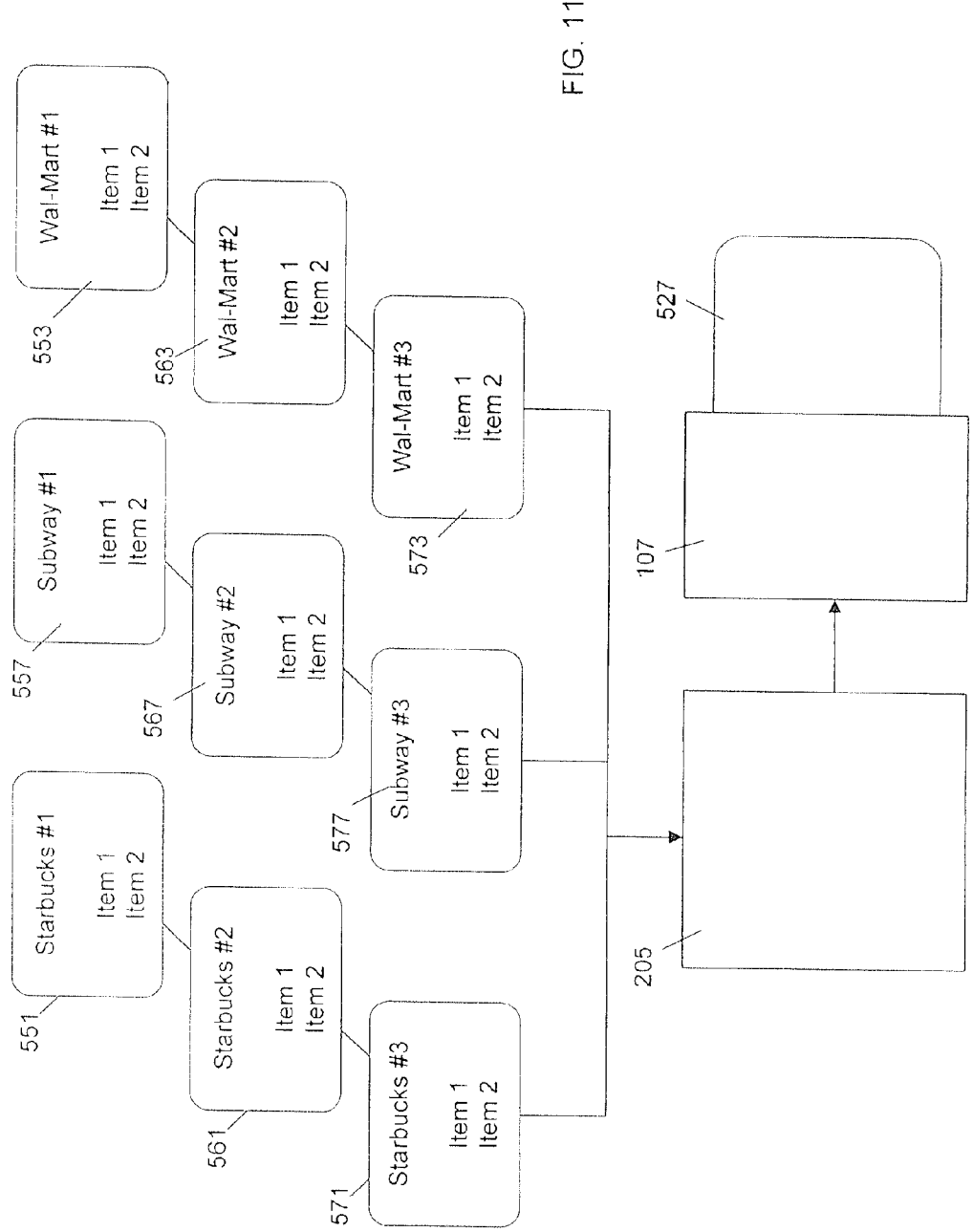
FIG. 11 illustrates a block diagram of the Unified Card system used with multiple branches of multiple merchants.

With reference to FIG. 11, many merchants have many local retail stores. Thus, a consumer may shop at any number of different stores that are operated by or franchises of the same merchant. In order to allow the Unified Card 527 to be used to exchange or return goods at any associated store, the system may use the same security mechanisms for all stores. For example, the receipt data written on the Unified Card 527 at a Starbucks #1 551 will be in the same security format as the receipt data written at Starbucks #2 561 and Starbucks #3 571. Thus, receipt data written at Starbucks #1 can be read by the register systems 205 located at Starbucks #2 561 and Starbucks #3 571. However, receipt data written on the Unified Card 527 at all Subway stores 557, 567, 577 or Wal-Mart stores 553, 563, 573 cannot be ready by any registers 205 located at any Starbucks 551, 561, 571.

In general, these chains of retail stores may also allow items to be purchased at one store and returned or exchanged at another store. For example, a first item purchased at a first Wal-Mart store 553 can be returned at a second Wal-Mart store 573. The user will insert the Unified Card 527 into the card reader 107 located at the first Wal-Mart store 553 which records the receipt. The user may then go to a second Wal-Mart store 573 and insert the Unified Card 527 into the card reader 107 at that store. The card reader 107 at the second Wal-Mart store 573 will read the receipt data recorded at the first Wal-Mart store 553 and allow the goods to be returned or exchanged at a second Wal-Mart store 573.

In some cases, one company may own multiple stores that sell the same items. For example, GAP, Old Navy and Banana Republic are all commonly owned merchants. If a Unified Card is used to make a purchase at a GAP, the items may be returned later for store credit. In an embodiment, the store credit may be stored as receipt data on the Unified Card. Rather than limiting the use of the store credit to GAP only, the system may allow the store credit to be used at other commonly owned stores including Old Navy and Banana Republic.

In an embodiment, the receipts data to be stored on the unified storage card and the user interface for the merchant registers can be purely customized based upon the merchants' preferences or the end customer needs. For example, with reference to FIGS. 12-15, data screens can be configured for a preferred sales receipt input and receipt data recording to the Unified Card. In some cases, the Unified Cards can be integrated with other purchase programs such as frequent flier miles, club membership points, purchase assistance programs or other purchase systems. In these embodiments, the system may record points or dollars spent on goods and services using a specific type of purchase transaction such as credit card.

In other embodiments, different programs such as food purchase assistance programs can be associated with the Unified Card. One example of a food purchase assistance program is Women, Infants and Children ("WIC"). In some situations, an end user may need to verify the goods purchased with the food purchase assistance program to confirm compliance with the program rules. In these embodiments, the present invention can be configured to incorporate the required inputs for these purchase programs into the user interface and receipt data recordation. In these embodiments, the Unified Card system can be configured with a WIC option and the installer shall choose whether the purchase is WIC or NON WIC. If the purchase is a WIC transaction, the installed register software component shall utilize WIC rules associated with the WIC purchase requirements. In particular under the WIC rules, purchased items cannot be returned or exchanged at the WIC business, unless the customer is still at the shop itself. The WIC rules can also be used to manage store vouchers IDs used for the purchase transactions, WIC total and the like. More details regarding the WIC rules are disclosed in US Patent Publication No. 20060047569 which is hereby incorporated by reference.

Figures 12, 13:
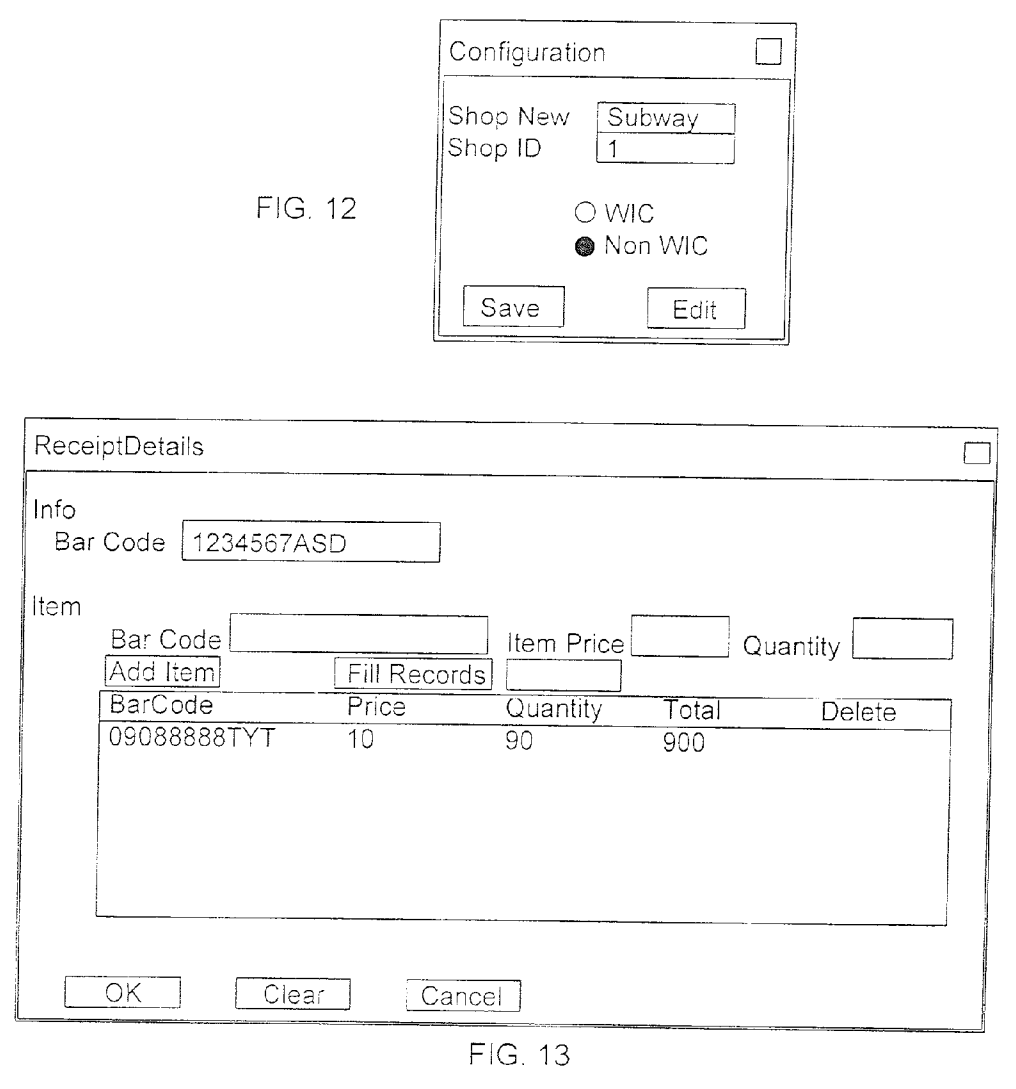

With reference to FIG. 12, a Unified Card user may make a purchase at a Subway store 1. When the purchase is made, the application program can read the Unified Card of the customer and the merchant register may display a first input window. The system displays the Shop Name as Subway and the Shop ID as 1. In this example, the system has been configured to include an input for WIC. The first input screen asks the cashier if the transaction is a WIC purchase or a Non WIC purchase. In this example, the cashier has indicated that the purchase is a Non WIC purchase. In some stores, the Unified Card system has been configured as a NON WIC store and the system will automatically choose "NON WIC." Thus, the cashier may not need to select WIC or NON WIC. In other embodiments, stores like FoodMax and other stores that shall deal with both "WIC/NON WIC" at the same time we will adopt WIC transaction as a normal sales transaction to simplify things and cases. In these embodiments, the cashier can manually select either WIC or NON WIC. The save button can be clicked by the cashier and the next window can be displayed or the exit button can be pressed to cancel the transaction.

With reference to FIG. 13, a data input screen is illustrated after a cashier has selected a NON WIC transaction. In this example, the user interface screen shows the bar code, price, quantity and total price. The bar code can be input manually or through a scanning device such as a laser checkout scanner. In this example, the bar code number 1234567ASD is a reference number representing the entire receipt. Within the receipt there can be bar code numbers for each individual item in the entire receipt. In this example, the bar code number 09088888TYT can be associated with a specific product that has been purchased, the price is $10 per unit and the quantity is 90. Thus, the total price of $900 is 90 units times $10/unit. The cashier can press the "OK" button and the next screen can be illustrated. Alternatively, if the clear button is clicked, the input data can be erased or if the cancel button is clicked, the transaction can be cancelled.

With reference to FIG. 14, a user interface screen is illustrated asking if the system should "Add eReceipt", "Read/Refresh eReceipts" or "Manual Format." By actuating the Add eReceipt button, the eReceipt will be written to the Unified Card that has been placed in the card reader or in the proximity of the RF card reader. Alternatively, the cashier can actuate the Read/Refresh eReceipts button to read the recorded receipts on the Unified Card. The cashier can also press Manual Format which provides the option to print a physical receipt such as a paper receipt with or without any electronic recording on the Unified Card. In this example, the user interface screen displays the Bar Code 1234567ASD representing the entire purchase receipt, the transaction date, Bar Code 09088888TYT which represents one specific item of the receipt, the unit price, the purchase quantity and total purchase cost.

Figure 15:
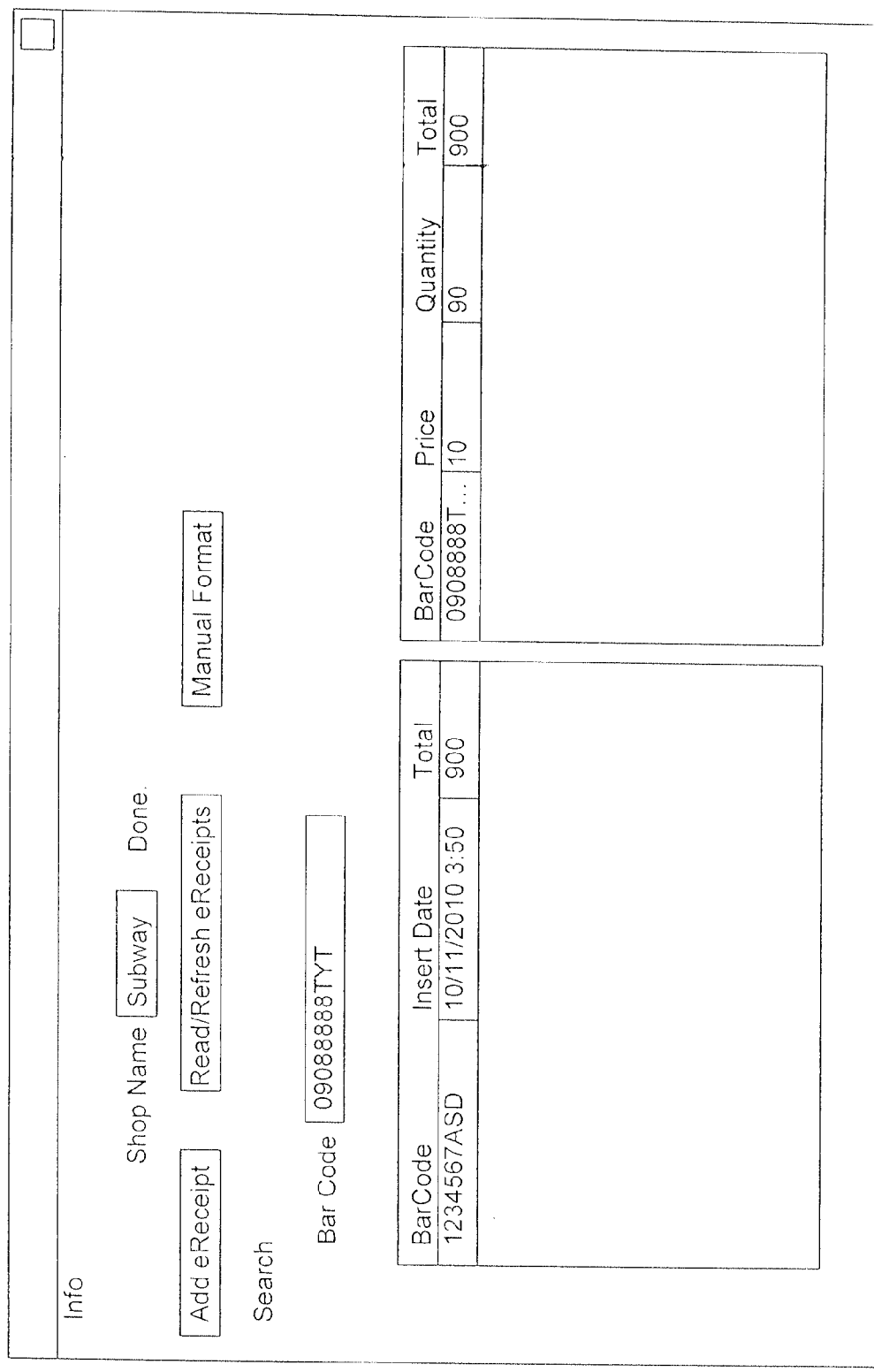

With reference to FIG. 15, if the customer needs to return or replace some of the purchased goods, he or she can return to the store and place the Unified Card in the card reader. The barcode or other identification label for the item being returned can be scanned or input by the cashier. In this case, the bar code 09088888TYT is input and the system searches the electronic receipt for goods that correspond to this identification bar code. The Bar Code 1234567ASD representing the entire purchase receipt and the Bar Code 09088888TYT which represents item on the receipt, the unit price, the purchase quantity and the total purchase cost of the transaction are than displayed. The cashier has the electronic receipt and the return or exchange can be processed. The return or exchange transaction can be recorded onto the Unified Card.

Figure 16:
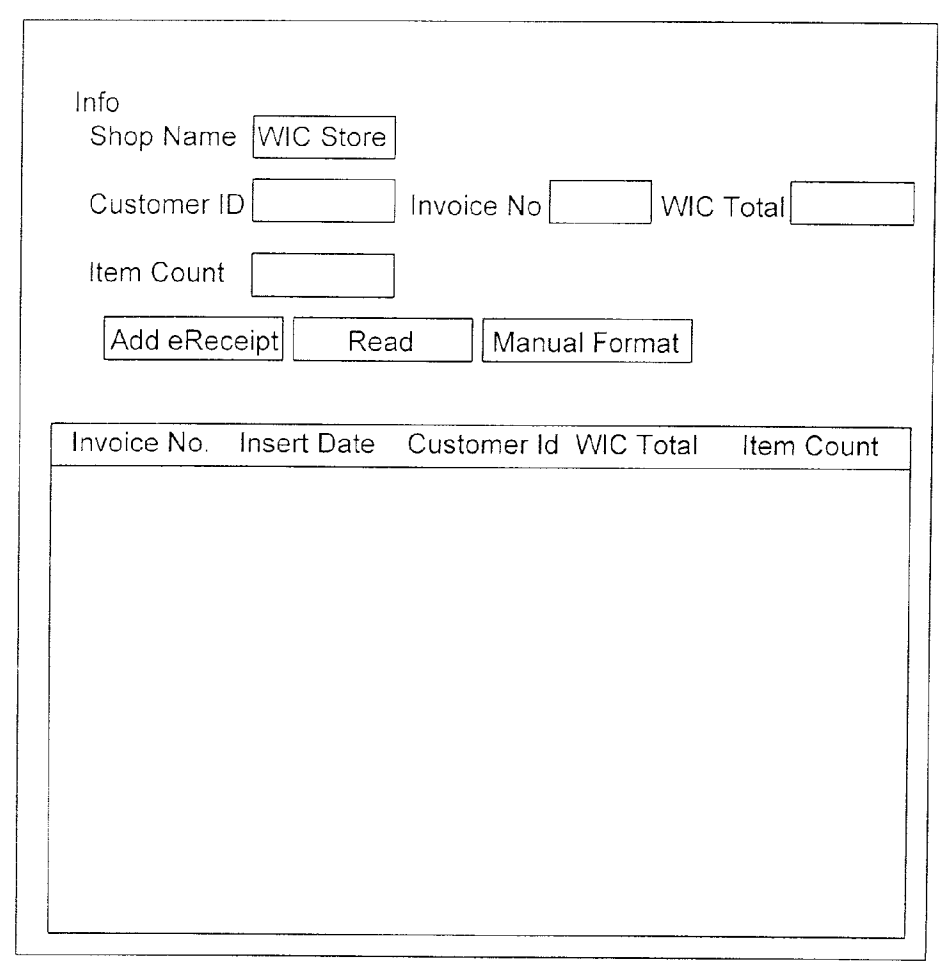

With reference to FIG. 16, if the cashier had selected a WIC purchase the user interface can display a WIC transaction screen. The WIC purchase user interface can include inputs or windows for Customer ID, Invoice No. WIC Total and Item Count. The Customer ID can be the customer's WIC ID. The invoice number can be the invoice identification number. The WIC total can be the total dollar WIC purchase value. The Item Count can be the number of items being purchased through the WIC transaction. The card reader can read the recorded transactions which can be listed on the lower portion of the user interface screen.

Figure 17:
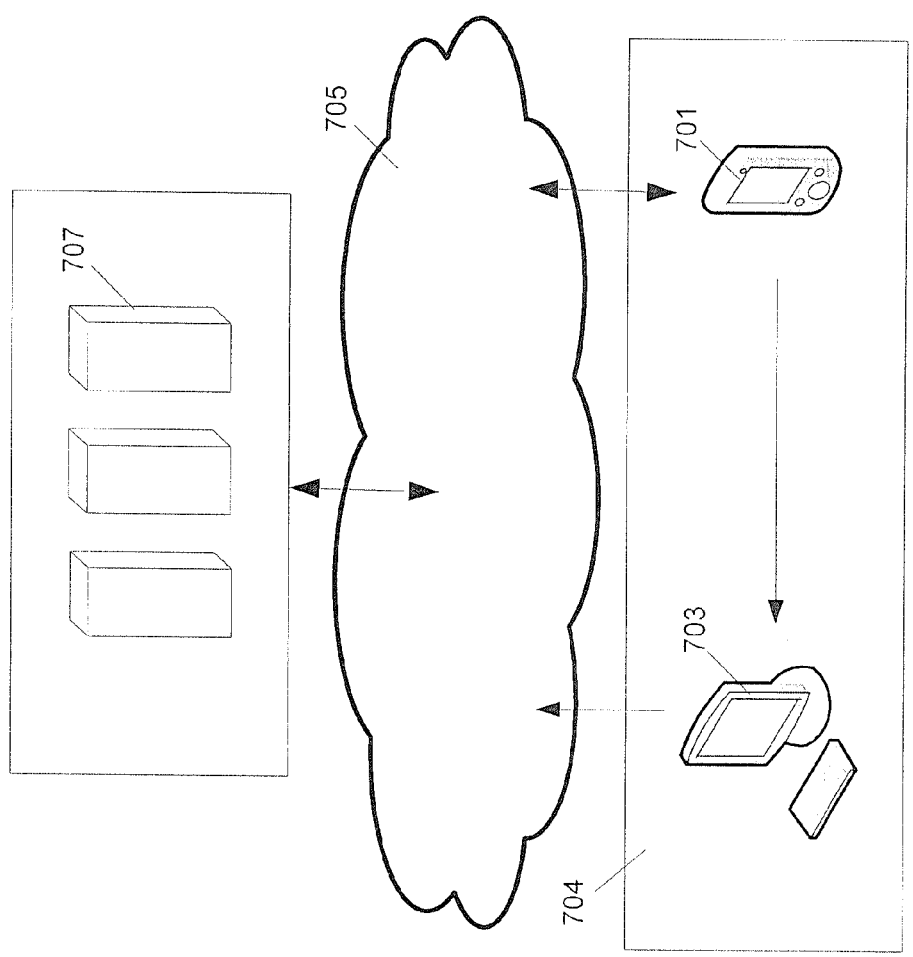
FIG. 17 is a block diagram of a smartphone embodiment of the receipt storage system.

In another embodiment, a mobile device such as a smartphone running a software program can be used to perform a function that is similar to the unified card and store customer receipts. With reference to FIG. 17, an embodiment of the smartphone system 700 is illustrated. A customer can download an application to the smartphone 701 and run the application when purchases are made. When purchases are made, a customer may enter a store 704 and the smartphone 701 can be used to display a code such as a bar code or transmit a signal that identifies the customer to the point of sale cashier 703. The cashier 703 can then process the purchases and record the purchased items. The customer's purchase information is then transmitted through a secure network 705 such as the internet to cloud servers 707 which stores the purchase information. The purchase information can then be downloaded from the cloud servers 707 to the smartphone 701 through a synch process. During the synchronization process the communications will be secured and encrypted using SSL security socket layer between the smartphone 701 client and server 707. The purchase receipt confirmation can be received by the smartphone 701 and stored in a memory of the smartphone 701.

When a customer signs up for participation with the receipt storage system, the user may access the servers through a web browser to access the download website. With reference to FIG. 18, a customer may be required to register to use the application by inputting identification information such as an e-mail address, a user name and a password so that the customer is registered with the receipt recording system. The customer information is transmitted to a system server and information about the user can be stored in a database. The system may perform some verification of the customer and transmit an e-mail message to the customer if any errors in the user data are found. In other embodiments, the application may be downloaded through a web based application storefront such as Apple's App Store. Once the customer is registered, the server can transmit security information to the customer's e-mail address authorizing the application program to be down loaded to the customer's smartphone or mobile computer.

Figure 19:
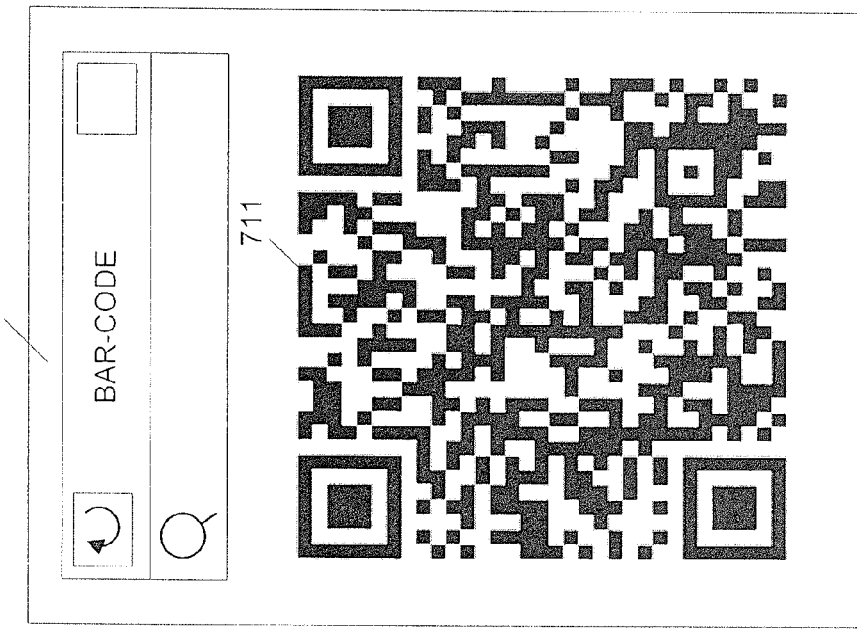
FIG. 19 is a view of a bar code displayed by the smartphone.

With reference to FIG. 19, when a customer wants to use the application to store the purchases, the application can be run on the smartphone 701. The application may require the customer to input a registered user name and password to access the e-receipt application. When the application is authorized with the user information, the smartphone can display the user's specific bar code 711 so the purchases can be made. The bar code 711 can be read by the cashier and the goods or services can be purchased. After the transaction is recorded by the system, the customer can also download his or her purchase information. A secured encryption tool can encrypt all purchase information and the encrypted information may only be decrypted and viewed by the registered customer.

Figure 20:
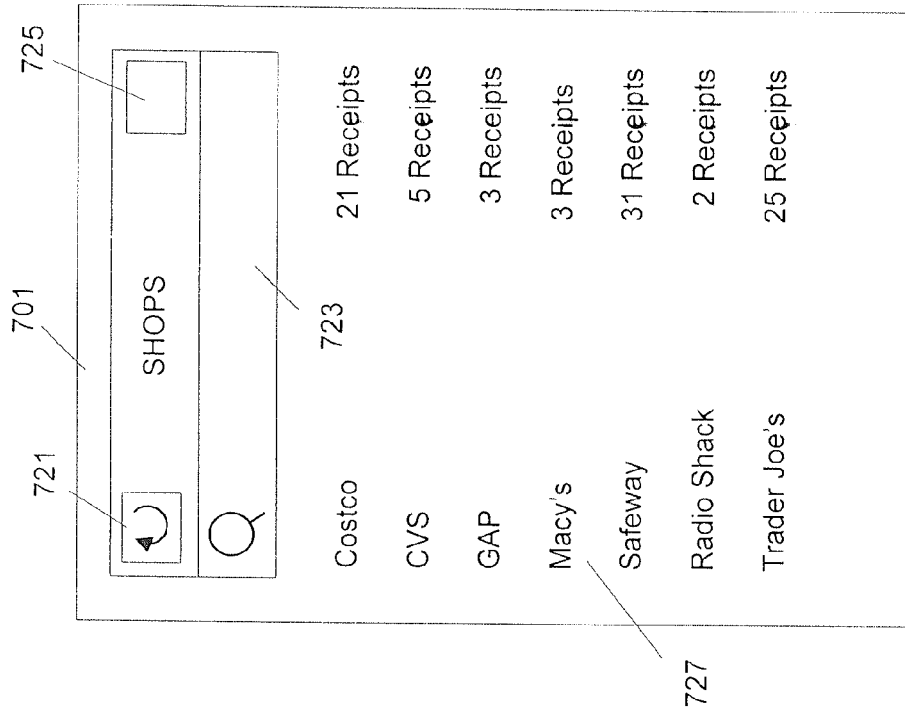
FIG. 20 is a view of the smartphone graphical user interface.

With reference to FIG. 20, the application can include a user interface that can display all the stored receipts on the smartphone 701. In this example, the user interface 713 can include a synch button 721, a search input box 723, a search button 725 and a list of stores or merchants 727 where the user has purchased goods. The synch button 721 can be actuated to cause all current receipts to be down loaded from the server to the smartphone 701. The search input box 723 can be used to input the name of a store or merchant and the search button 725 can be used to search the stored receipts for the input store or merchant. The list of stores or merchants 727 can be organized alphabetically, chronologically, by popularity or any other user selected manner. In addition to the stores, the system can display the number of receipts stored for each store. By selecting a specific store, the individual store receipts can be displayed and printed if necessary. The stored information may include additional information about the purchases such as: time of purchase, location of store, phone number of store, cashier ID, etc.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment. For example, the unified card can be a smart card, RF cards, data card, SD card, USB flash memory card or other similar device. The smart phone can be a mobile phone, a mobile computer such as a tablet or any other similar portable device having a microprocessor, memory and a display.

What is claimed is:

1. A system for storing receipts comprising:
a cloud server coupled to a network;
a first merchant register coupled to a first reader at a first merchant, the first reader configured for receiving identification information about a user from a smartphone of the user, the first merchant register having a first encryption scheme for encrypting a first receipt from a first purchase transaction by the user, the first merchant register transmitting the encrypted first receipt through the network to the cloud server; and
a second merchant register coupled to a second reader at a second merchant, the second reader configured for receiving the identification information about the user from the user's smartphone, the second merchant register having a second encryption scheme, different than the first encryption scheme, for encrypting a second receipt from a second purchase transaction by the user, the second merchant register transmitting the encrypted second receipt through the network to the cloud server;
wherein the cloud server stores the encrypted first receipt and the encrypted second receipt, the cloud server transmits the encrypted first purchase data receipt and the encrypted second receipt to the user's smartphone, and wherein the first merchant register and the first reader cannot read the encrypted second receipt and the second merchant register and the second card reader cannot read the encrypted first receipt.

2. The system of claim 1 wherein the user's smartphone displays the encrypted first receipt and the encrypted second receipt.

3. The system of claim 1 wherein the user's smartphone includes a memory device for storing the encrypted first receipt and the encrypted second receipt.

4. The system of claim 1 further comprising:
a first kiosk located in the proximity of the first merchant configured for reading the encrypted first receipt, the first kiosk cannot write the encrypted first receipt to a memory device.

5. The system of claim 1 wherein the identification information is a barcode displayed on the user's smartphone.

6. The system of claim 4 further comprising:
a second kiosk located in the proximity of the second merchant configured for reading the encrypted second receipt, the second kiosk cannot write the encrypted second receipt to the memory device.

7. The system of claim 6 wherein the second kiosk cannot read the encrypted first receipt.

8. A system for storing receipts comprising:
a cloud server coupled to a network; and
a first merchant register coupled to a first reader at a first merchant, the first reader configured for receiving identification information from a smartphone for a first purchase transaction, the first merchant register having a first encryption scheme for encrypting a first receipt and the first merchant register transmitting the encrypted first receipt through the network to the cloud server;
wherein the cloud server stores the encrypted first receipt and other receipts encrypted in other encryption schemes that are different than the first encryption scheme, the cloud server transmits the encrypted first receipt to the smartphone, wherein the first merchant register and the first reader cannot read the other receipts.

9. The system of claim 8 wherein the smartphone displays the encrypted first receipt and the encrypted other receipts.

10. The system of claim 8 further comprising:
a kiosk located in the proximity of the first merchant for reading the encrypted first receipt, the kiosk cannot write the encrypted first receipt to a memory device.

11. A method for storing receipts comprising:
inputting by a first merchant register, an identification code from a smartphone of a user;
generating first receipt data from the first merchant register based upon a first purchase of goods by the user;
encrypting the first receipt data by the first merchant register in a first encryption scheme;
transmitting the encrypted first receipt data to a cloud server;
storing the encrypted first receipt data with other receipt data that has been encrypted in other encryption schemes that are different than the first encryption scheme on the cloud server;
transmitting by the cloud server, the encrypted first receipt data and the encrypted other receipt data to the user's smartphone; and
storing the encrypted first receipt data and the encrypted other receipt data in a memory device in the user's smartphone.

12. The method of claim 11 wherein the identification code is a barcode displayed on the user's smartphone.

13. The method of claim 11 wherein the identification code is an identification signal transmitted by the user's smartphone.

14. The method of claim 11 further comprising:
downloading an e-receipt application to the user's smartphone; and
running the e-receipt application on the user's smartphone.

15. The method of claim 11 further comprising:
displaying the encrypted first receipt data on a kiosk display.

16. The method of claim 11 further comprising:
inputting user identification information into a home computer after the encrypted first receipt data has been stored on the cloud server; and
displaying the first receipt data on a home computer display.

17. The method of claim 11 further comprising:
generating second receipt data from a second merchant register based upon a second purchase of goods by the user;
encrypting the second receipt data by the second merchant register in a second encryption scheme;
transmitting the encrypted second receipt data to the cloud server;
storing the encrypted second receipt data with other receipt data that has been encrypted in other encryption schemes that are different than the second encryption scheme on the cloud server;
transmitting by the cloud server, the encrypted second receipt data to the user's smartphone; and
storing the encrypted second receipt data in the memory device of the user's smartphone;
wherein the first merchant register cannot read the encrypted second receipt data and the second merchant register cannot read the encrypted first receipt data.

18. The method of claim 17 further comprising:
inputting user identification information into the second merchant register before the encrypted second receipt data has been transmitted.

19. The method of claim 18 further comprising:
displaying the encrypted second receipt data on the user's smartphone.

20. The method of claim 17 further comprising:
inputting by the second merchant register, the identification code from the user's smartphone.

21. The method of claim 17 further comprising:
inputting user identification information into the kiosk after the encrypted second receipt data has been written;
displaying the encrypted second receipt data on a kiosk display; and
preventing the display of the encrypted first receipt data on the kiosk display.

22. The method of claim 17 further comprising:
inputting user identification information into a home computer after the encrypted second receipt data has been stored on the cloud server; and
displaying the encrypted second receipt data on a home computer display.

23. The method of claim 11 further comprising:
reading the encrypted first receipt data by the first merchant register to confirm the first purchase of goods;
returning the first purchase of goods to the first merchant register;
generating first return data from the first merchant register based upon the return of the first purchase of goods;
encrypting the first return data by the first merchant register;
transmitting the encrypted first return data to the cloud server;
storing the encrypted first return data on the cloud server;
transmitting by the cloud server, the encrypted first return data to the user's smartphone; and
storing the encrypted first return data on the memory device in the user's smartphone.

24. The method of claim 23 further comprising:
inputting by the first merchant register, the identification code from the user's smartphone with the memory device storing the encrypted first receipt data.

25. The method of claim 23 wherein the identification code is an identification signal transmitted by the user's smartphone.

26. The method of claim 23 further comprising:
downloading an e-receipt application to the user's smartphone; and
running the e-receipt application on the user's smartphone.

* * * * *